United States Patent [19]

Indyke

[11] Patent Number: 4,826,886

[45] Date of Patent: May 2, 1989

[54] POLYIMIDE FOAMS AND THEIR PRODUCTION

[75] Inventor: David M. Indyke, Arlington Heights, Ill.

[73] Assignee: Ethyl Corporation, Richmond, Va.

[21] Appl. No.: 276,937

[22] Filed: Nov. 28, 1988

Related U.S. Application Data

[62] Division of Ser. No. 199,991, May 26, 1988.

[51] Int. Cl.$^4$ ............................................. C08J 9/02
[52] U.S. Cl. ................................. 521/185; 521/184; 521/189; 528/188; 528/189; 528/192; 528/229; 528/353
[58] Field of Search ................. 521/184, 185, 189; 528/188, 189, 192, 229, 353

[56] References Cited

U.S. PATENT DOCUMENTS

| Re. 30,213 | 2/1980 | Gagliani et al. | 521/185 |
|---|---|---|---|
| Re. 32,255 | 9/1986 | Gagliani et al. | 521/56 |
| Re. 32,256 | 9/1986 | Gagliani et al. | 521/180 |
| 3,506,583 | 4/1970 | Boram et al. | 252/188 |
| 3,700,649 | 10/1972 | Boram et al. | 260/65 |
| 3,726,831 | 4/1973 | Acle et al. | 260/47 CP |
| 3,726,834 | 4/1973 | Acle | 260/65 |
| 3,793,281 | 2/1974 | Acle | 260/2.5 N |
| 4,070,312 | 1/1978 | Gagliani et al. | 260/2.5 N |
| 4,153,783 | 5/1979 | Gagliani et al. | 528/337 |
| 4,241,114 | 12/1980 | Gagliani | 427/370 |
| 4,241,193 | 12/1980 | Gagliani | 521/77 |
| 4,255,488 | 3/1981 | Gagliani | 428/398 |
| 4,273,886 | 6/1981 | Gagliani | 521/185 |
| 4,296,208 | 10/1981 | Gagliani | 521/77 |
| 4,299,787 | 11/1981 | Gagliani | 264/41 |
| 4,305,796 | 12/1981 | Gagliani et al. | 204/159 |
| 4,315,076 | 2/1982 | Gagliani et al. | 521/77 |
| 4,315,077 | 2/1982 | Gagliani et al. | 521/77 |
| 4,315,080 | 2/1982 | Gagliani et al. | 521/189 |
| 4,319,000 | 3/1982 | Gagliani et al. | 521/189 |
| 4,332,656 | 6/1982 | Gagliani et al. | 204/159 |
| 4,346,182 | 8/1982 | Gagliani et al. | 521/189 |
| 4,353,998 | 10/1982 | Gagliani et al. | 523/219 |
| 4,355,120 | 10/1982 | Gagliani et al. | 521/189 |
| 4,360,604 | 11/1982 | Gagliani et al. | 521/189 |
| 4,361,453 | 10/1982 | Gagliani et al. | 156/79 |
| 4,363,690 | 12/1982 | Gagliani et al. | 156/307 |
| 4,363,883 | 12/1982 | Gagliani et al. | 521/122 |
| 4,367,296 | 1/1983 | Gagliani et al. | 521/189 |
| 4,369,261 | 1/1983 | Gagliani et al. | 521/189 |
| 4,407,980 | 10/1983 | Gagliani et al. | 521/99 |
| 4,425,441 | 1/1984 | Gagliani et al. | 521/56 |
| 4,426,463 | 1/1984 | Gagliani et al. | 521/180 |
| 4,433,068 | 2/1984 | Long et al. | 521/54 |
| 4,439,381 | 3/1984 | Gagliani et al. | 264/26 |
| 4,442,283 | 4/1984 | Gagliani et al. | 528/323 |
| 4,444,823 | 4/1984 | Gagliani et al. | 428/113 |
| 4,468,431 | 8/1984 | Okey | 428/317 |
| 4,476,254 | 10/1984 | Long et al. | 521/180 |
| 4,506,038 | 3/1985 | Gagliani et al. | 521/103 |
| 4,518,717 | 5/1985 | Long et al. | 521/109 |
| 4,535,099 | 8/1985 | Lee et al. | 521/154 |
| 4,535,101 | 8/1985 | Lee et al. | 521/189 |
| 4,539,336 | 9/1985 | Long et al. | 521/77 |
| 4,539,342 | 9/1985 | Lee et al. | 521/189 |
| 4,546,115 | 10/1985 | Gagliani et al. | 521/77 |
| 4,556,682 | 12/1985 | Gagliani et al. | 521/185 |
| 4,562,112 | 12/1985 | Lee et al. | 428/318 |
| 4,576,862 | 3/1986 | Lee et al. | 428/317 |
| 4,585,805 | 4/1986 | Gagliani et al. | 521/129 |
| 4,599,365 | 7/1986 | Gagliani et al. | 521/56 |
| 4,600,770 | 7/1986 | Gagliani et al. | 528/322 |
| 4,604,409 | 8/1986 | Gagliani et al. | 521/157 |
| 4,621,015 | 11/1986 | Long et al. | 428/317 |
| 4,639,343 | 1/1987 | Long et al. | 264/45.5 |
| 4,647,597 | 3/1987 | Shulman et al. | 521/185 |
| 4,656,198 | 4/1987 | Shulman et al. | 521/56 |
| 4,708,972 | 11/1987 | Long et al. | 521/185 |

OTHER PUBLICATIONS

Gagliani, NAS9-14718, Final Report 7/1/75-12/31/75 entitled "Fire Resistant Resilient Foams".

Gagliani, et al, NAS9-16050, Final Report, Jun., 1977, entitled "Development Fire-Resistant, Low Smoke Generating, Thermally Stable End Items for Aircraft and Spacecraft".

Gagliani, et al., NAS9-15848, Final Report 2/15/77-4/15/80 entitled "Development of Fire-Resistant, Low Smoke Generating, Thermally Stable End Items for Commercial Aircraft & Spacecraft Using a Basic Polyimide Resin".

Gagliani, et al. NAS9-16009, Final Report 2/15/80-9/30/81 entitled "Formulation & Characterization of Polyimide Resilient Foams of Various Densities for Aircraft Seating Applications".

*Primary Examiner*—Morton Foelak
*Attorney, Agent, or Firm*—John F. Sieberth

[57] ABSTRACT

Described are flexible polyimide foams having enhanced compression characteristics and softness for use in the manufacture of seat cushions and methods for the production of such foams and precursors therefor. These foams are produced from novel polyimides prepared by reaction of at least one aromatic or heterocyclic primary diamine with a mixture of at least two organic tetracarboxylic acids or derivatives thereof, at least one of which is from 1 to 40 mol percent of a 2-(vicinal-dicarboxycyclohexenyl)succinic acid or derivative thereof and a second of which is an aromatic tetracarboxylic acid or derivative thereof. Foams can be produced having (a) a fatigue life as determined by ASTM test procedure D 3574-81 on foam specimens in the range of from three to five inches in thickness of at least 14,000 cycles, or (b) a compression set as determined by ASTM test procedure D 3574-81, using foam specimens one inch thick and two inches in width and in length, of less than 30% at 50% compression, or both of (a) and (b).

17 Claims, No Drawings

POLYIMIDE FOAMS AND THEIR PRODUCTION

This application is a division of application Ser. No. 199,991, filed May 26, 1988.

TECHNICAL FIELD

This invention relates to new and useful polyimides, and more particularly to novel polyimides and polyimide foams having improved properties, to novel precursors from which such polyimides and polyimide foams can be prepared, and to processes for their preparation.

BACKGROUND

A great deal of effort has been devoted to the development of polyimides and polyimide foams having useful properties. One promising area of application for flexible polyimide foams is as a potential substitute for flammable polyurethane foams in aircraft seat cushions and the like, where the fire resistance and lightness of polyimides would be of considerable advantage.

Unfortunately, previously known flexible polyimide foams generally suffer from either or both of two shortcomings limiting their usefulness for seat cushion applications:

1. Lack of sufficient compression fatigue life, which means that the foam prematurely loses its resiliency (ability to return to its original shape) after repeated compression during usage.
2. Lack of sufficient softness which causes the cushion to be stiffer and less comfortable than desired.

THE INVENTION

This invention provides new and useful flexible polyimides at least some of which can overcome either or both of the foregoing shortcomings.

Pursuant to one embodiment there is provided a polyimide foam prepared by reaction of at least one aromatic or heterocyclic primary diamine with a mixture of at least two organic tetracarboxylic acids or derivatives thereof, at least one of which is from 1 to 40 mol percent, and preferably from 10 to 30 mol percent, of a 2-(vicinal-dicarboxycyclohexenyl)succinic acid or derivative thereof and a second of which is an aromatic tetracarboxylic acid or derivative thereof. These polyimides per se constitute an additional embodiment of this invention.

Another embodiment of this invention involves provision of a foamable polyimide precursor comprising an essentially stoichiometric mixture of (a) at least one aromatic or heterocyclic primary diamine, and (b) a miture of at least two organic tetracarboxylic acid esters, at least one of which is from 1 to 40 mol percent, and preferably 10 to 30 mol percent, of an ester of a 2-(vicinal-dicarboxycyclohexenyl)succinic acid and a second of which is an ester of an aromatic tetracarboxylic acid.

A still further embodiment of this invention involves a method of preparing a polyimide foam which comprises (1) reacting an essentially stoichiometric mixture of (a) at least one aromatic or heterocyclic primary diamine, and (b) a mixture of at least two organic tetracarboxylic acid esters, at least one of which is from 1 to 40 mol percent, and preferably 10 to 30 mol percent, of an ester of a 2-(vicinal-dicarboxycyclohexenyl)-succinic acid and a second of which is an ester of an aromatic tetracaboxylic acid; and (2) heating the reaction mixture to cure it into a polyimide foam. When using the free tetracarboxylic acid or a salt, acid halide or anhydride thereof, a suitable blowing agent should be present in the reaction mixture to cause the foam structure to be developed. Use of the ester is preferred as this results in the development of the foam structure even without use of a blowing agent.

Yet another embodiment of this invention is a polyimide foam having (a) a fatigue life as determined by ASTM test procedure D 3574-81, using foam specimens from three to five inches in thickness, of at least 14,000 cycles or (b) a compression set as determined by ASTM test procedure D 3574-81, using foam specimens one inch thick and two inches in length and in width, of less than 30% at 50% compression, or both of (a) and (b). For the purposes of this invention, failure in the foregoing fatigue life test procedure is either (i) a thickness loss of more than 10%, (ii) a loss in indentation force deflection at 40% deflection of more than 10%, or (iii) a significant visually-perceivable surface cracking.

The above and other embodiments, features and advantages of this invention will become still further apparent from the ensuing description and appended claims.

In the practice of this invention the flexible polyimides are formed by use of a combination of organic tetracarboxylic acids or derivatives thereof, one of which is a 2-(vicinal-dicarboxycyclohexenyl)succinic acid or derivative thereof and a second of which is an aromatic tetracarboxylic acid or derivative thereof.

Such dicarboxycyclohexenyl acids may be represented by the general formula:

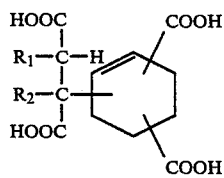

wherein $R_1$ and $R_2$ are, independently, hydrogen or lower alkyl, wherein the two carboxyl groups are attached to adjacent carbon atom of the cyclohexene ring, and wherein the cyclohexene ring may be substituted with appropriate substituents such as halogen, alkyl, alkoxy, or the like. The derivatives of such acids include the salts, acid halides, dianhydrides, and esters thereof.

A preferred subclass of these vicinal dicarboxycyclohexenyl succinic acids (and their corresponding derivatives) are the 2-(4,5-dicarboxy-2-cyclohexenyl)succinic acids of the formula:

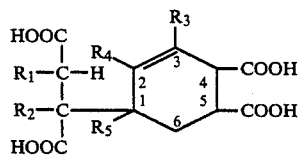

wherein $R_1$, $R_2$, $R_3$, and $R_5$ are, independently, hydrogen or lower alkyl, and wherein $R_4$ is hydrogen and lower alkyl or halogen. These compounds may be prepared by reacting maleic anhydride, or a mono- or dialkyl substituted maleic anhydride with a conjugated diene, such as 1,3-butadiene, isoprene, chloroprene, 2-ethyl-1,3-butadiene, 2,3-dimethyl-1,3-butadiene, 1,3-pentadiene, 1,3-hexadiene, 1,3-octadiene, or the like to form a 4-cyclohexene-1,2-dicarboxylic anhydride. This, in turn, is reacted with maleic anhydride, or a mono- or dialkyl substituted maleic anhydride to produce the dianhydride of the 2-(4,5-dicarboxy-2-cyclohexenyl)-succinic acid. Hydrolysis of the dianhydride yields the free tetracarboxylic acid whereas reaction of the dianhydride with an alcohol yields the preferred esters used as a component in the polyimide precursors of this invention. For further details concerning the reactions of this type, see U.S. Pat. Nos. 4,271,079 and 4,371,688.

Representative of such derivatives are the following:
2-(4,5-dicarboxy-2-cyclohexenyl)succinic acid dimethyl ester
2-(4,5-dicarboxy-2-cyclohexenyl)succinic acid diethyl ester
2-(4,5-dicarboxy-2-cyclohexenyl)succinic acid diisopropyl ester
2-(4,5-dicarboxy-2-cyclohexenyl)succinic acid dibutyl ester
2-(4,5-dicarboxy-3-methyl-2-cyclohexenyl)succinic acid dimethyl ester
2-(4,5-dicarboxy-3-methyl-2-cyclohexenyl)succinic acid diethyl ester
2-(4,5-dicarboxy-3-methyl-2-cyclohexenyl)succinic acid dipropyl ester
2-(4,5-dicarboxy-3-ethyl-2-cyclohexenyl)succinic acid dimethyl ester
2-(4,5-dicarboxy-3-ethyl-2-cyclohexenyl)succinic acid diethyl ester
2-(4,5-dicarboxy-3-ethyl-2-cyclohexenyl)succinic acid dipropyl ester
2-(4,5-dicarboxy-3-butyl-2-cyclohexenyl)succinic acid dimethyl ester
2-(4,5-dicarboxy-3-methyl-2-cyclohexenyl)-3-methylsuccinic acid dimethyl ester
2-(4,5-dicarboxy-3-methyl-2-cyclohexenyl)-2,3-dimethylsuccinic acid diethyl ester
2-(4,5-dicarboxy-2-chloro-2-cyclohexenyl)succinic acid dimethyl ester
2-(4,5-dicarboxy-2-methyl-2-cyclohexenyl)succinic acid dimethyl ester
2-(4,5-dicarboxy-2-methyl-2-cyclohexenyl)succinic acid diethyl ester
2-(4,5-dicarboxy-2-methyl-2-cyclohexenyl)succinic acid diisopropyl ester
2-(4,5-dicarboxy-2-ethyl-2-cyclohexenyl)succinic acid dimethyl ester
2-(4,5-dicarboxy-2-ethyl-2-cyclohexenyl)succinic acid diethyl ester
2-(4,5-dicarboxy-2-ethyl-2-cyclohexenyl)succinic acid diisopropyl ester
2-(4,5-dicarboxy-1,2-dimethyl-2-cyclohexenyl)succinic acid dimethyl ester
2-(4,5-dicarboxy-1,2-dimethyl-2-cyclohexenyl)succinic acid diethyl ester
2-(4,5-dicarboxy-1,2-dimethyl-2-cyclohxenyl)succinic acid diisopropyl ester
2-(4,5-dicarboxy-2-methyl-2-cyclohexenyl)-3-methylsuccinic acid dimethyl ester
and the like. Mixtures of such diesters may be employed.

The other organic tetracarboxylic acid(s) or derivative(s) thereof used in the practice of this invention are preferably aromatic tetracarboxylic acids or derivatives thereof having the general formula:

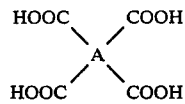

wherein A is a tetravalent organic group. The tetravalent organic group A is preferably one having one of the following structures:

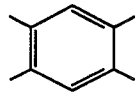

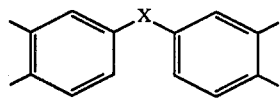

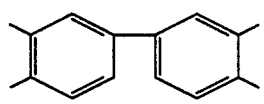

wherein X is one or more of the following:

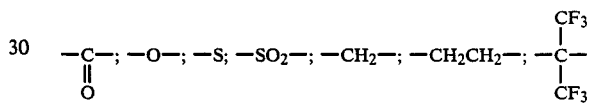

Preferred among the tetracarboxylic acid esters are the alkyl esters of 3,3',4,4'-benzophenone tetracarboxylic acid, most preferably the lower alkyl diesters thereof. Mixtures of two or more aromatic esters, most preferably predominating in diesters, may be employed, if desired.

It is also possible, in accordance with this invention, that the tetracarboxylic acid derivative employed in the manufacture of the polyimide foams be a caprolactam as taught by U.S. Pat. Nos. 4,161,477, 4,183,838 and 4,183,839, the disclosures of which are incorporated herein by reference. As described in those patents, a bis-imide is formed by reaction of a tetracarboxylic acid dianhydride with an oxoimine such as caprolactam and then reacted with the diamine or diamines to produce the desired polyimides. The caprolactam is displaced during the reaction, in much the same way as is the ester portion of the tetracarboxylic acid ester.

The organic diamines with which the foregoing mixture of tetracarboxylic acids or derivatives is employed may be represented by the formula:

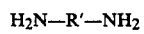

wherein R' is an aromatic group containing 5 to 16 carbon atoms and containing up to one hetero atom in the ring, the hetero atom being nitrogen, oxygen or sulfur. Also included are aromatic groups such as:

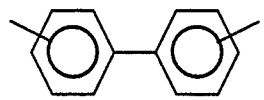

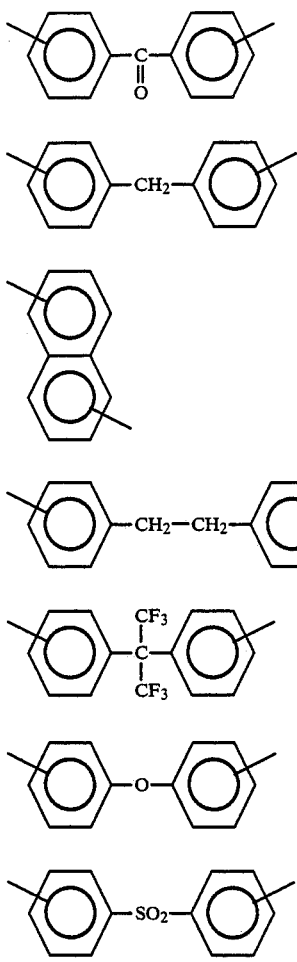

Representatives of such diamines include:
2,6-diaminopyridine;
3,5-diaminopyridine;
3,3'-diaminodiphenylsulfone;
4,4'-diaminodiphenylsulfone;
4,4'-diaminodiphenylsulfide;
3,3'-diaminodiphenylether;
4,4'-diaminodiphenylether;
meta-phenylenediamine;
para-phenylenediamine;
4,4'-methylene dianiline;
2,6-diamino toluene;
2,4-diamino toluene;
and the like.

It is also possible and sometimes desirable in the preparation of the polyimide precursors of this invention, to include in the reaction mixture one or more aliphatic diamines. Such aliphatic diamines are preferably alpha-omega diaminoalkanes having the formula:

$$H_2N-(CH_2)_n-NH_2 \qquad (I)$$

wherein n is an integer from 2 to 16. Representatives of such diamines include 1,3-diaminopropane, 1,4-diaminobutane, 1,5-diaminopentane, 1,6-diaminohexane, etc.

In place of or in addition to the foregoing aliphatic amines, use can be made of aliphatic etherified polyamines of the type polyoxypropylene amines having the formula:

$$H_2N-CH(CH_3)CH_2-[OCH_2CH(CH_3)]_x-NH_2 \qquad (II)$$

wherein x varies from 1 to about 5 carbon atoms.

Other useful primary diamines which may be included in the products of this invention include amino-terminated butadienenitrile copolymers having the general formula:

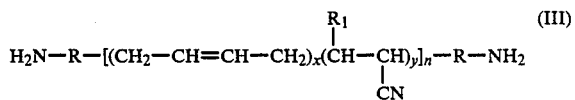

wherein R is either a phenylene group or an alkylene group, $R_1$ is hydrogen or methyl, and x and y or each independently integers ranging from 1 to 25 and n is an integer, preferably below 20. In these copolymers it is preferred that butadiene constitute at least 50% by weight of the butadiene and nitrile monomer. The nitrile monomer copolymerized with the butadiene can either be acrylonitrile or methacrylonitrile. Such copolymers generally have low molecular weights, preferably less than 3,000 to insure that they are sufficiently fluid to react in the formation of the polyimide as well as sufficiently fluid so as to be capable of foaming.

Still another type of primary diamines which may be included in the products of this invention is the aromatic amino-terminated silicones, such as those having the general formula:

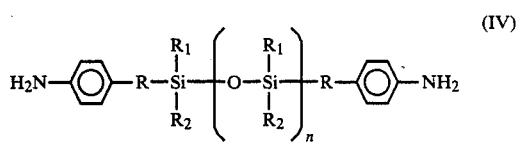

wherein R is a $C_2$ to $C_6$ alkylene group, $R_1$ and $R_2$ are each independently lower alkyl containing 1 to 3 carbon atoms and n is an integer from 1 to 4.

Another preferred category of diamines which may be utilized in forming the foams of this invention are the diesters of an amino-substituted aromatic carboxylic acid and a polymethylene glycol. Such diesters may be represented by the general formula:

$$H_2N-ArCOO-R-OOCAr-NH_2 \qquad (V)$$

wherein R is an alkylene group (which may be branched or straight chain) and which preferably contains from 3 to 8 carbon atoms, most preferably trimethylene; and Ar is an aromatic group which may be composed of one or more fused or non-fused benzene rings which in turn may carry suitable substituents (e.g., nitro, alkoxy, etc.) in addition to the primary amino groups.

A few exemplary diesters of this type include:
ethylene glycol-4-aminobenzoic acid diester;
ethylene glycol-3-aminobenzoic acid diester;
ethylene glycol-2-aminobenzoic acid diester;
trimethylene glycol-3-aminobenzoic acid diester;
trimethylene glycol-2-aminobenzoic acid diester;
trimethylene glycol-3-amino-2-nitrobenzoic acid diester;

tetramethylene glycol-3-amino-4-nitrobenzoic acid diester;
tetramethylene glycol-3-amino-5-nitrobenzoic acid diester;
tetramethylene glycol-4-amino-2-nitrobenzoic acid diester;
1,5-pentanediol-4-amino-3-nitrobenzoic acid diester;
1,6-hexanediol-5-amino-2-nitrobenzoic acid diester;
neopentyl glycol-4-amino-2-methylbenzoic acid diester;
1,8-octanediol-4-amino-2-propylbenzoic acid diester;
1,9-nonanediol-3-amino-4-methylbenzoic acid diester;
1,10-decanediol-4-(4-aminophenyl)benzoic acid diester;

and the like. Mixtures of such diesters may be employed.

A particularly preferred diester of this type is the diester of trimethylene glycol (1,3-propanediol) and 4-aminobenzoic acid.

In the practice of this invention the organic tetracarboxylic acid preferably in the form of its diester, most preferably from methanol or ethanol, is reacted with the above-referred-to amine(s) to form a prepolymer in the form of a consolidated, fragile foam structure, which is then subjected to additional heating in order to effect imide formation and thereby cure the polymer. When using the tetracarboxylic acid ester this operation can be conducted either in the presence or absence of an added blowing agent to provide the desired polyimide foam.

The relative proportions used in the preparation of the precursors and polymers of this invention can be varied. In general, it is preferred to employ essentially stoichiometric proportions as between the mixture of tetracarboxylic acids or derivatives thereof and the primary diamine(s). However, nonstoichiometric mixtures can be used although the excess of the reactant present in excess usually does not participate in the reaction. As noted above, about 1 to about 40 mol percent (preferably about 10 to about 30 mol percent, most preferably about 20 mol percent) of the combination of tetracarboxylic acids or derivatives thereof employed is composed of one or more dicarboxycyclohexenyl succinic acids or their derivatives. The balance of the combination is preferably composed of one or more aromatic or heterocyclic diamines with or without the addition of still other diamines, for example diamines of the type referred to hereinabove in Formulas I, II, III, IV and V, or any mixture thereof. Usually the overall combination of amines will contain no more than about 10 mol percent of the diamines of Formulas I, II, III and IV. In the case of diamines of Formula V, these may comprise up to about 40 mol percent of the mixture of diamines used.

In accordance with one preferred form of the invention, use is made of a combination of aromatic amines, one of which is a nitrogen heterocyclic diamine, preferably 2,6-diaminopyridine and/or 3,5-diaminopyridine, while the other is a diamine containing two benzene rings, preferably 4,4'-methylenedianiline and/or 4,4'-oxydianiline. When using a combination of aromatic amines in accordance with this concept, the mol ratio of the non-heterocyclic diamine to the nitrogen-containing heterocyclic diamine is within the range of 1.0 to 3.0, and preferably 1.5 to 2.8.

When using a lower alkyl ester of the tetracarboxylic acid, the resulting alcohol produced in the reaction as well as the water released during the reaction can be used as the blowing agent during polymerization to form the desired polyimide foams. Alternatively, use can be made of any of a variety of organic or inorganic blowing agents. By use of a solid blowing agent such as Celogen TSH, Celogen OT, Celogen AZ 130, Celogen RA, Celogen HT 500, Celogen HT 550, sodium bicarbonate, benzenesulfonyl hydrazide, boric acid, benzoic acid, and Expandex 5 PT of controlled particle size, the homogeneity of the cellular structure of the resulting polyimide foam can be more accurately controlled. Preferred for such use are solid blowing agents which have been subjected to ball milling or other grinding so that the blowing agent is less than 200 microns in diameter, with 98 percent of the blowing agent particle sizes being less than 150 microns in diameter.

The chemical compositions of the blowing agents identified by trade name above follow:

| Blowing Agent | Chemical Composition |
| --- | --- |
| Celogen TSH | toluenesulfonyl hydrazide |
| Celogen OT | p,p'-oxybis(benzenesulfonyl hydrazide) |
| Celogen AZ 130 | azodicarbonamide |
| Celogen RA | p-toluenesulfonyl semicarbazide |
| Celogen HT 500 | a modified hydrazine derivative |
| Celogen HT 550 | hydrazol dicarboxylate |
| Expandex 5 PT | 5-phenyltetrazole |

Variations in the concentration of the blowing agent can be used to achieve specific densities and ILD values. Concentrations of up to 10 percent based on the weight of the polyimide precursor, and preferably 1 to 5 percent, can be employed. A concentration of about 2.5 weight percent is particularly preferred.

Hydrated organic compounds of the type referred to in U.S. Pat. No. 4,621,015 may also be used as blowing agents in the process.

In the practice of this invention, it is possible to include in the reaction mixture various filler and/or reinforcing materials. For example, graphite, glass and other synthetic fibers can be added to the composition to produce a fiber-reinforced product. Microballons may be added for density adjustment, if desired. It is frequently desirable to employ a surfactant thereby increasing cellular structure stability and uniformity, and increase fatigue resistance and make the foam more flexible and resilient. The nature of such surfactants for this use is well known and reported in the patent literature.

Although not necessary, for some applications it is desirable to add a suitable quantity of a flame retardant material to the formulation in order to still further increase the flame resistance of the resultant foam.

In preparing the precursors of this invention, it is preferred to employ the procedures and spray drying techniques described in U.S. Pat. No. 4,296,208, the disclosure of which is incorporated herein by reference.

The temperatures at which the precursor is converted to the polyimide foam are generally those temperatures used in the preparation of other polyimide polymers. As a general rule temperatures ranging from 200° to 400° C. can be used, with heating times from 5 to 60 minutes or longer. As those skilled in the art will appreciate, the time for carrying out the reaction is somewhat dependent upon the reaction temperature, higher temperatures enabling the use of shorter reaction times. It is also possible to heat to a lower temperature in the first stage of the reaction and then to higher temperatures in the later stages.

Heating can be carried out in a conventional oven if desired. Alternatively, the foaming and curing of the precursor into a foamed polyimide polymer can be effected by means of microwave heating. In this technique, the precursor is exposed for 120 minutes to radio frequencies within the range of 915 to 2450 MHz, with the power output ranging from 1 to 100 kw. The power output to prepolymer weight ratio generally falls within the range of 0.1 to 10 kw per kg.

Having described the basic concepts of the invention, reference is now made to the following examples which are provided by way of illustration, but not by way of limitation of the practice of the invention.

The following abbreviations are used in the examples:

MDA—4,4'-Methylenebisaniline
DAP—2,6-Diaminopyridine
mPMBA—4,4'-[1,3-phenylenebis(1-methylethylidene)]bisaniline
pPMBA—4,4'-[1,4-phenylenebis(1-methylethylidene)]bisaniline
ATBN—Amino-terminated poly(butadiene-acrylonitrile). (HYCAR 1300X16)
ODA—4,4'-Oxydianiline
B-4400—5-(2,5-dioxotetrahydrofuryl)-3-methyl-3-cyclohexene-1,2-dicarboxylic anhydride from Dainippon Ink & Chemicals Co., Inc. under the trade designation EPICLON B-4400 —see U.S. Pat. No. 4,271,079
M-5060—5-(2,5-dioxotetrahydrofuryl)-4-methyl-3-cyclohexene-1,2-dicarboxylic anhydride from Milliken Chemical Division of Milliken Company under the trade designation MILLDRIDE® 5060—see U.S. Pat. No. 4,371,688
BTDA—Benzophenone tetracarboxylic acid dianhydride
DC-193—Polysiloxane surfactant (Dow Corning Corporation)
pcf—Pounds per cubic foot
IFD—Indentation force deflection as measured by the Indentation Force Test of ASTM Test Designation D 3574-81

All polyimide foams were produced using a two-stage microwave-thermal oven procedure. The microwave was a Gerling Moore 5.5 kw microwave cavity having two microwave sources, only one of which was used. Low power (one source) was 1.5 kw and full power (one source) was 2.75 kw.

Compression set determinations were conducted according to ASTM Test Designation D3574-81 using specimens two inches long, two inches wide and one inch thick, compressed by specified amounts and held for twenty-two hours at 70° C.

Roller fatigue results were measured using the Dynamic Fatigue Test by the "Roller Shear at Constant Force" according to ASTM Test Designation D 3574-81.

EXAMPLE 1

Formulation

[(0.70 mol MDA+0.30 mol DAP) per (0.80 mol BTDA+0.20 mol B-4400)]+1.84% of DC-193 based on the combined weights of the monomers.

Procedure

A three-necked round bottom, glass flask in a heating mantle equipped with a stirrer, reflux condenser and thermometer was charged with 311.3 g (0.97 mols) of BTDA, 63.6 g (0.24 mol) of B-4400, 307.1 g (9.6 mols) of methanol, and 16.9 g of water. The heater and stirrer were switched on. The solution was milky off-white in appearance. After 22 minutes, with the temperature at 50° C., the heater was switched off and the mixture was stirred for another 15 minutes. At this point the temperature had reached 68° C. and the reaction mixture had turned into a clear, dark amber solution indicating completion of the esterification reaction. While stirring the system and keeping the temperature between 43° and 47° C., the diamines were added using methanol dilution and washes, in the following amounts and sequence: 166.6 g (0.84 mol) MDA and 39.2 g (0.36 mol) DAP. Next, with the temperature raised to 48° C., 1.0 g of DC-193 diluted with methanol was added, again using a methanol rinse and the system was stirred.

The solution was partially dried in a deep pan using a thermal oven maintained at 50° F. for 1.5 hours. The product was then subjected to final drying by use of a vacuum oven held at 150° F. with the vacuum initially adjusted to 25 inches of mercury and subsequently increased to 29 inches of mercury. The vacuum and drying procedure involved a total period of 3 hours and 40 minutes. The solids were subjected to agitation in order to produce the polyimide precursor in powder form. A total of 637.2 g of polyimide precursor was recovered.

The precursor was placed in a mold and exposed to microwave radiation for 19 minutes at 2.75 kw. The resultant consolidated foamy product was transferred to a thermal oven held at 470° F. for 37 minutes and at 490° F. for an additional 25 minutes, and allowed to cool.

Using trimmed sections from the resultant cured foam, measurements and observations were made of their properties.

Results

The foam was soft and flexible, yet extremely resilient. It was deemed very promising for use in seat cushions. The foam had a density of 0.87 pcf. The foam had compression sets of 21% at 50% compression and 61% at 90% compression after 22 hours at 70° C. It had a tensile strength of 21 psi, a elongation at break of 24% and a LOI (ASTM D 2863-77) of 35.

EXAMPLE 2

Formulation

[(0.73 mol MDA+0.3 mol mPMBA) per (0.8 mol BTDA+0.2 mol B-4400)]+1.88% DC-193 based on the combined weights of the monomers.

Procedure

A mixture of diesters was prepared in a three-necked flask using 309 g (0.96 mols) of BTDA, 63 g (0.24 mol) of B-4400, 308 g (9.61 mols) of methanol and 15 g of water during a 46 minute reaction period with a temperature controlled between 23° and 70° C. The diamines were then added to the deep, clear amber solution. The following sequence and amounts of addition were used: 124 g (0.36 mol) of mPMBA and 175 g (0.88 mol) of MDA. These additions occurred over a period of about 2 hours and 5 minutes with the temperature between 35° and 63° C. Methanol rinses were employed. Thereupon 12.6 g of DC-193 dissolved in methanol was added, again using a methanol rinse. The resultant reaction solution was then stirred for 2 hours and 51 minutes and then allowed to stand overnight. The resultant reaction solution was then dried using a vacuum oven with the vacuum adjusted from 25 to 29 inches of mercury and a temperature of 150° F. The powder was converted into a polyimide foam using a mold in a 2-stage microwave-thermal oven procedure. The powder was subjected to microwaving for 20 minutes at 1.5 kw. In the thermal oven the temperatures were 450° F. for 4 hours and 50 minutes, 460° F. for 42 minutes and 470° F. for 51 minutes. Trimmed sections of the foam were used in determining the physical properties described below.

Results

The polyimide foam was very firm but resilient and flexible with a density of 0.63 pcf. It had a 50% compression set of 35% and a 90% compression set of 75%.

EXAMPLE 3

Formulation

[(0.73 mol MDA+0.27 mol DAP) per (0.8 mol BTDA+0.2 mol M-5060)]+1.85% DC-193 based on the combined weights of the monomers.

Procedure

A mixture of diesters was formed from 309 g (0.96 mol) of BTDA, 64 g (0.24 mol) of M-5060, 308 g (9.61 mols) of methanol and 15 g of water. Heat was applied to the mixture causing its temperature to rise from 27° C. to 69° C. To the resultant clear, deep coffee-colored solution were added MDA (180 g; 0.91 mol) and DAP (36 g; 0.33 mol). The additions were facilitated by use of methanol rinses and during the additions the temperature of the reaction mixture was controlled between 48° and 50° C. over a period of 19 minutes. To the reaction mixture was then added 10.9 g of DC-193 using methanol dilution and rinse. The resultant mixture was stirred for about 2 hours and 5 minutes. The solution was allowed to stand overnight.

The polyimide precursor was isolated in powder form by use of a vacuum oven operated generally as in Example 2. The yield of dried polyimide precursor was 614 g. Sieved polyimide precursor was converted into polyimide foam in a mold by use of the 2-stage microwave-thermal oven procedure. The microwave portion of the cycle involved 20 minutes at 1.5 kw. The final curing in the oven occurred at 470° F. over a period of 2 hours and 11 minutes.

Results

The foam was soft and flexible and had a density of 0.62 pcf, a 50% compression set of 29% and a 90% compression set of 67%.

EXAMPLE 4

Formulation

[0.72 mol MDA+0.31 mol DAP+0.00038 mol ATBN) per (0.8 mol BTDA+0.2 mol B-4400)]+2.32% DC-193 based on the combined weights of the monomers.

Procedure

A methanol solution of diesters was produced from 309 g (0.96 mol) of BTDA, 63 g (0.24 mol) of B-4400, 308 g (9.61 mols) of methanol and 15 g of water. The reaction temperature was raised from 23° to 69° C. during a reaction period of 35 minutes. To this solution were added the following ingredients in the following sequence: ATBN (0.80 g; 0.0046 mol); MDA (170 g; 0.86 mol); DAP (40 g; 3.37 mol); and DC-193 (13.5 g). The MDA, DAP and DC-193 were added as methanol solutions and methanol rinses were employed. The maximum reaction temperature was 69° C. The polyimide precursor was recovered by means of vacuum drying procedure using a vacuum oven with vacuum ranging from an initial pressure of 25 inches of mercury up to full vacuum of 28 to 29 inches of mercury. The solids were subjected to agitation in order to produce the polyimide precursor in powder form. A total of 648 g of polyimide precursor in powder form was recovered. Polyimide foams were produced using a 2-stage free-rise microwave-thermal oven procedure (microwave: 1.5 kw for 20 minutes; thermal oven: 470° F. for 1 hour 55 minutes). Trimmed sections from the resultant foam were used for physical property determinations and observations.

Results

The foam was soft and flexible with a density of 0.47 pcf. It exhibited a 50% compression set of 32% and a 90% compression set of 66%. The foam had a tensile strength of 6 psi and an elongation at break of 21%.

EXAMPLE 5

Formulation

[(0.57 mol MDA+0.46 mol DAP) per (0.8 mol BTDA+0.2 mol B-4400)]+1.85% DC-193 based on the combined weights of the monomers.

Procedure

The following ingredients were used to produce a mixture of 2-(4,5-dicarboxy-3-methyl-2-cyclohexenyl)-succinic acid dimethyl ester and benzophenonetetracarboxylic acid dimethyl ester in methanol: 309 g (0.96 mol) of BTDA; 63 g (0.24 mol) of B-4400; 308 g (9.61 mols) of methanol; and 15 g of distilled water. To the methanol solution of the resultant dimethyl esters were added 135 g (0.68 mol) of MDA and 60 g (0.55 mol) of DAP using methanol dilution and rinses. Then, 10.5 g of DC-193 was introduced into the reaction mixture in the form of a methanol solution and using a methanol rinse. After stirring the mixture for about 26 minutes stirring was discontinued and the solution transferred to a foil-lined deep pan for drying. The polyimide precursor was recovered in powder form after vacuum drying at 150° F. with a vacuum of from 25 to 29 inches of mercury. The recovery was 621 grams. Polyimide foam was produced in a mold from the polyimide precursor powder by use of the 2-stage microwave-thermal oven procedure (microwave: 1.5 kw for 20 minutes; thermal oven: 470° F. for 2 hours). Trimmed sections of the foam were subjected to physical property determinations.

Results

The foam was soft, flexible and resilient with a density of 0.42 pcf. It had a 50% compression set of 25% and 90% compression set of 58%, a tensile strength of 10 psi and an elongation at break of 27%.

EXAMPLE 6

Formulation

[(0.75 mol MDA+0.27 mol DAP) per (0.8 mol BTDA+0.2 mol B-4400)]+1.84% DC-193 based on the combined weights of the monomers.

Procedure

A methanol solution of mixed methyl diesters was produced in a 5-liter reaction flask equipped with stirring and heating means using the following ingredients: 1,289 g (4.00 mols) of BTDA, 264 g (1.00 mol) of B-4400, 1,025 g (31.99 mols) of methanol and 48 g of water using the general procedure of Example 1. This system was stirred for 50 minutes while raising the temperature from 23° to 72° C. at which point the solution turned clear and deep amber indicating completion of the esterification reaction. Thereupon 739 g (3.73 mols) of MDA and 150 g (1.37 mols) of DAP were introduced into the reaction mixture using methanol dilution and rinsing. During these additions the temperature was in the order of 52° to 54° C. Then, 45 g of DC-193 was added as a methanol solution. The total amount of methanol added with the MDA, DAP and DC-193 was 712 g. The mixture was then stirred for 3 hours and 4 minutes. The product was spray dried using a NIRO ATOMIZER spray dryer equipped with a disc atomizer operated 32,500 to 34,500 rpm with occasional excursions as low as at 29,000 rpm; with outlet temperature generally in the range of 68° to 73° C.; with occasional excursion down to 64° C. and up to 70° C.; and with inlet temperatures ranging between 95° to 121° C. In approximately 2.5 hours the initial solution of about 4.5 liters in volume was converted into spray dried polyimide precursor powder weighing 2,731 grams. Polyimide foams were produced from the polyimide precursor (in one case, microwave: 20 minutes at 1.5 kw; thermal oven: 2.5 hours at 470° F.; in another case, microwave: 5 minutes at 1.5 kw followed by 10 minutes at 2.5 kw; thermal oven: 1 hour 35 minutes at 470° F.; and in still another case, microwave: 20 minutes at 1.5 kw; thermal oven: 1 hour 37 minutes at 470° F.). Trimmed sections of the foams were subjected to physical property determinations.

Results

Resilient, flexible foams were produced with a density of 0.70 pcf. The 50% compression set was 33% and the 90% compression set was 69%. The IFD was 30 pounds of force at 25% deflection and 110 pounds of force at 65% deflection.

EXAMPLE 7

Formulation

[(0.675 mol MDA+0.36 mol DAP+0.000375 mol ATBN) per (0.8 mol BTDA+0.2 mol B-4400)]+1.38% DC-193 based on the combined weights of the monomers.

Procedure

A solution of mixed diesters in methanol was formed using BTDA (309 g; 0.96 mol), B-4400 (63 g; 0.24 mol); methanol (308 g; 9.6mols) and distilled water (15 g). Over a period of 40 minutes with continued stirring, the temperature was raised from 24° C. to 70° C. at which point the solution was clear and dark amber in color indicating completion of the esterification. The diamines were added as follows: ATBN (0.78 g; 0.00045 mol); MDA (160 g; 0.81 mol); and DAP (47 g; 0.43 mol) using a total of 183 g of methanol for dilution and washes. The temperature during the operations varied between 48° and 71° C. and occurred over a period of 3 hours 49 minutes with stirring. With the temperature at 42° C., 8.0 g of DC-193 was then introduced using some of the 180 g of methanol for dilution and rinsing. The resultant mixture was stirred for 2 hours 34 minutes. The polyimide precursor was recovered in powder form by use of a spray dryer, and sieved through a No. 25 screen. Using a mold, the polyimide precursor was converted into polyimide foam by exposure for 20 minutes in a microwave (1.5 kw power) and 1 hour 28 minutes at 470° F. in a thermal oven.

Results

The firm, resilient foam had a density of 0.89 pcf, a 50% compression set of 26% and a 90% compression set of 60%.

EXAMPLE 8

Formulation

[(0.30 mol DAP+0.71 mol pPMBA) per (0.80 mol BTDA+0.20 mol B-4400)]+1.90% DC-193 based on the combined weights of the monomers.

Procedure

A methanol solution of combined diesters was produced from 785 g (2.40 mols) of BTDA, 159 g (0.6 mol) of B-4400, 769 g (24.0 mols) of methanol and 36 g of water. This solution was heated and stirred for 45 minutes during which time the temperature went from 27° C. to 70° C. The diamines were then added to the resulting clear, deep amber solution. The following sequence and amounts of addition were used: pPMBA (744 g; 2.14 mols) and DAP (101 g; 0.91 mol), both of which were added in admixture with methanol followed by methanol rinses. The additions occurred over a period of 50 minutes with the temperature being raised from 48° C. to 68° C. Finally, 34 g of DC-193 was added in combination with methanol. In these additions a total of 526 g of methanol was added to the initial methanolic diester solution. The solution was stirred without added heat for about 6 hours.

The polyimide precursor was then converted to powder form by means of spray drying and the resultant powder screened whereby 1,956 grams of product were obtained.

The two-stage microwave-thermal procedure was employed to produce polyimide foam from which a section was trimmed.

Results

A firm, but flexible foam having a density of 0.95 pcf was produced.

EXAMPLE 9

Formulation

[(0.71 mol ODA+0.30 mol DAP) per (0.80 mol BTDA+0.20 mol B-4400)]+1.90% DC-193 based on the combined weights of the monomers.

Procedure

The following ingredients were charged into a reaction flask: BTDA (785 g; 2.40 mols), B-4400 (159 g; 0.60 mol); methanol (769 g; 24.00 mols), and distilled water (36 g). The resulting mixture was stirred and heated for 45 minutes during which the temperature was raised from 25° to 71° C. To the resulting clear, deep amber reaction solution were added: ODA (430 g; 2.14 mols), DAP (101 g; 0.91 mol) and DC-193 (28 g). These additions were made using methanol both as a diluent and as a rinsing agent. The temperature of the reaction solution during the additions was maintained within the range of 49° to 67° C. A total of 460 g of methanol was employed for these dilution and rinsing operations. The polyimide precursor powder was recovered by spray drying the reaction solution under nitrogen using atomizer speeds in the range of 24,300 to 24,900 rpm, inlet temperatures from 93° to 104° C. and outlet temperatures from 68.7° to 69.7° C. This yielded 1,680 grams of polyimide precursor in powder form. After screening, the precursor was converted into polyimide foam by use of a two-stage microwave-thermal oven procedure under the following conditions: microwave: 12 minutes at 2.75 kw; thermal oven: 485° F. for 2 hours 10 minutes.

Results

The product was a firm, but flexible and resilient foam with a density of 0.76 pcf, an IFD of 60 pounds of force at 25% deflection and 255 pounds of force at 65% deflection. The foam exhibited no weight loss and an average thickness loss of but 5.5% after 14,002 cycles in the roller fatigue tester.

When producing the polyimides of this invention for applications other than foams (e.g., for structural applications, adhesives, films, or the like), the mixture of diamines may be reacted with the organic tetracarboxylic acid or a derivative thereof such as its dianhydride, its acid halides, it salts, or its esters. Use of tetracarboxylic acid dianhydrides is most preferred for these particular reactions because of their high reactivity.

It will be understood that various changes and modifications can be made in the details of procedure, formulation and use without departing from the spirit and scope of the invention.

What is claimed is:

1. A polyimide foam prepared by reaction of at least one aromatic or heterocyclic primary diamine with a mixture of at least two organic tetracarboxylic acids or derivatives thereof, at least one of which is from 1 to 40 mol percent of a 2-(vicinal-dicarboxycyclohexenyl)succinic acid or derivative thereof and a second of which is an aromatic tetracarboxylic acid or derivative thereof.

2. A polyimide foam as defined in claim 1 wherein said mixture of organic tetracarboxylic acids or derivatives thereof is a mixture of acid esters.

3. A polyimide foam as defined in claim 1 wherein the aromatic tetracarboxylic acid or derivative thereof includes benzophenone tetracarboxylic acid or derivative thereof.

4. A polyimide foam as defined in claim 1 wherein the reaction includes a surfactant, and optionally, a flame retardant.

5. A polyimide foam prepared by reaction of at least one aromatic or heterocyclic primary diamine with a mixture of at least two organic tetracarboxylic acid esters, at least one of which is from 10 to 30 mol percent of a lower alkyl ester of a 2-(4,5-dicarboxy-2-cyclohexenyl)succinic acid and a second of which is a lower alkyl ester of benzophenone tetracarboxylic acid.

6. A polyimide foam as defined in claim 5 wherein the reaction incudes a silicone surfactant, and optionally, a flame retardant.

7. A polyimide foam as defined in claim 5 wherein the aromatic or heterocyclic primary diamine is 4,4'-methylenedianiline or 4,4'-oxydianiline, or both.

8. A polyimide foam as defined in claim 7 wherein the aromatic or heterocyclic diamine further includes 2,6-diaminopyridine.

9. A polyimide foam as defined in claim 7 further including an amino-terminated butadiene-acrylonitrile reactant.

10. A polyimide foam as defined in claim 7 further including a diester of (i) a primary amino-substituted aromatic carboxylic acid and (ii) a polymethylene glycol.

11. A polyimide foam as defined in claim 5 wherein the lower alkyl ester of a 2-(4,5-dicarboxylic-2-cyclohexenyl)succinic acid is a lower alkyl ester formed by reacting 5-(2,5-dioxotetrahydrofuryl)-3-methyl-3-cyclohexene-1,2-dicarboxylic anhydride or 5-(2,5-dioxotetrahydrofuryl)-4-methyl-3-cyclohexene-1,2-dicarboxylic anhydride with a lower alkanol.

12. A polyimide foam as defined in claim 11 wherein the reaction includes a silicone surfactant.

13. A polyimide foam prepared by reaction of at least one aromatic or heterocyclic primary diamine with a mixture of organic tetracarboxylic acid esters at least one of which is from 10 to 30 mol percent of a 2-(vicinal-dicarboxycyclohexenyl)succinic acid or derivative thereof and a second of which is an aromatic tetracarboxylic acid or derivative thereof in the presence of a surfactant, said foam having (a) a fatigue life as determined by ASTM test procedure D 3574-81 on foam specimens in the range of from three to five inches in thickness of at least 14,000 cycles, or (b) a compression set as determined by ASTM test procedure D 3574-81, using foam specimens one inch thick and two inches in width and in length, of less than 30% at 50% compression, or both of (a) and (b).

14. A polyimide foam as defined in claim 13 wherein said organic tetracarboxylic acid ester consists essentially a methyl or ethyl ester of benzophenone tetracarboxylic acid and said aromatic or heterocyclic primary diamine is composed predominantly of 4,4'-methylenedianiline or 4,4'-oxydianiline, or both.

15. A polyimide foam as defined in claim 14 wherein the 2-(vicinal-dicarboxycyclohexenyl)succinic acid or derivative thereof is is a lower alkyl ester of a 2-(4,5-dicarboxy-2-cyclohexenyl)succinic acid.

16. A polyimide foam as defined in claim 15 wherein said surfactant is a silicone surfactant.

17. A polyimide foam as defined in claim 16 wherein the reaction further includes an amino-terminated butadiene-acrylonitrile copolymer or 2,6-diaminopyridine, or both.

* * * * *

UNITED STATES PATENT AND TRADEMARK OFFICE
CERTIFICATE OF CORRECTION

PATENT NO. : 4,826,886
DATED : May 2, 1989
INVENTOR(S) : David M. Indyke

It is certified that error appears in the above-identified patent and that said Letters Patent is hereby corrected as shown below:

Column 1, line 53, reads "miture" and should read -- mixture --.

Column 3, line 59, reads "cyclohxenyl" and should read -- cyclohexenyl --.

Column 9, line 5, reads "is exposed for 120 minutes" and should read -- is exposed for 1 to 120 minutes --.

Column 10, line 17, reads "50°F" and should read -- 150°F --.

Column 13, line 53, reads "(308 g; 9.6 mols)" and should read --(308g; 9.61 moles) --.

Column 14, line 41, reads "producc" and should read -- produce --.

Column 16, line 2, reads "incudes" and should read -- includes --.

Signed and Sealed this

Fifth Day of June, 1990

*Attest:*

HARRY F. MANBECK, JR.

*Attesting Officer*  *Commissioner of Patents and Trademarks*